US010486492B2

United States Patent
Reichel

(10) Patent No.: US 10,486,492 B2
(45) Date of Patent: Nov. 26, 2019

(54) VENTILATION APPARATUS FOR A MOTOR VEHICLE

(71) Applicant: GM GLOBAL TECHNOLOGY OPERATIONS LLC, Detroit, MI (US)

(72) Inventor: Gregor Reichel, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 43 days.

(21) Appl. No.: 15/204,420

(22) Filed: Jul. 7, 2016

(65) Prior Publication Data

US 2017/0008371 A1 Jan. 12, 2017

(30) Foreign Application Priority Data

Jul. 7, 2015 (DE) .................... 20 2015 004 835 U

(51) Int. Cl.
*B60H 1/00* (2006.01)

(52) U.S. Cl.
CPC ..... *B60H 1/00842* (2013.01); *B60H 1/00678* (2013.01); *B60H 2001/00707* (2013.01); *B60H 2001/00721* (2013.01)

(58) Field of Classification Search
CPC ............ B60H 1/00678; B60H 1/00842; B60H 2001/00707; B60H 2001/00721
See application file for complete search history.

(56) References Cited

U.S. PATENT DOCUMENTS

| 2,225,071 | A | * | 12/1940 | Meyerhoefer | ..... B60H 1/00678 137/862 |
| 3,948,154 | A | | 4/1976 | Asakai et al. | |
| 4,267,880 | A | * | 5/1981 | Jacquet | .............. B60H 1/00678 137/862 |
| 4,383,642 | A | * | 5/1983 | Sumikawa | ......... B60H 1/00064 165/42 |
| 4,938,033 | A | * | 7/1990 | Ogihara | ............. B60H 1/00842 165/202 |

(Continued)

FOREIGN PATENT DOCUMENTS

DE 4101494 A1 7/1992
EP 0757943 A2 2/1997

(Continued)

OTHER PUBLICATIONS

German Patent Office, German Search Report for German Application No. 202015004835.8, dated Aug. 3, 2015.

(Continued)

*Primary Examiner* — Steven B McAllister
*Assistant Examiner* — Steven S Anderson, II
(74) *Attorney, Agent, or Firm* — Lorenz & Kopf, LLP

(57) ABSTRACT

A motor vehicle ventilation apparatus is provided including a distributor housing having at least two air ducts leading from the distributor housing. Through these two outgoing air ducts, an air mass flow that is fed to the housing or produced inside the housing is able to be distributed to at least two air outlets arranged at a distance from one another in an interior space of a motor vehicle. The air ducts leading from the distributor housing are each in flow communication with at least one of the air outlets. In addition, at least one servo unit is movable by a drive unit arranged adjacent to at least one of the air ducts in the distributor housing.

8 Claims, 3 Drawing Sheets

(56) References Cited

U.S. PATENT DOCUMENTS

| | | | | |
|---|---|---|---|---|
| 5,051,884 A * | 9/1991 | Iida | ................... | B60H 1/00842 |
| | | | | 165/202 |
| 5,102,041 A | 4/1992 | Fujiki et al. | | |
| 7,191,611 B2 | 3/2007 | Hatakeyama et al. | | |
| 7,954,540 B2 * | 6/2011 | Hoehn | ................. | B60H 1/0005 |
| | | | | 165/103 |
| 2005/0176362 A1 * | 8/2005 | Gehring | ............... | B60H 1/3414 |
| | | | | 454/153 |
| 2005/0233687 A1 * | 10/2005 | Wachter | ............ | B60H 1/00678 |
| | | | | 454/152 |
| 2006/0060341 A1 * | 3/2006 | Maehata | ............ | B60H 1/00671 |
| | | | | 165/202 |
| 2010/0210202 A1 * | 8/2010 | Kakizaki | ............ | B60H 1/00064 |
| | | | | 454/121 |

FOREIGN PATENT DOCUMENTS

| | | | |
|---|---|---|---|
| EP | 1319541 A2 * | 6/2003 | ......... B60H 1/00842 |
| JP | S6283214 * | 4/1987 | |
| JP | H0439116 A | 2/1992 | |
| JP | H0542816 A | 2/1993 | |

OTHER PUBLICATIONS

Intellectual Property Office, Search Report for United Kingdom Patent Application No. GB1610499.4 dated Nov. 23, 2016

\* cited by examiner

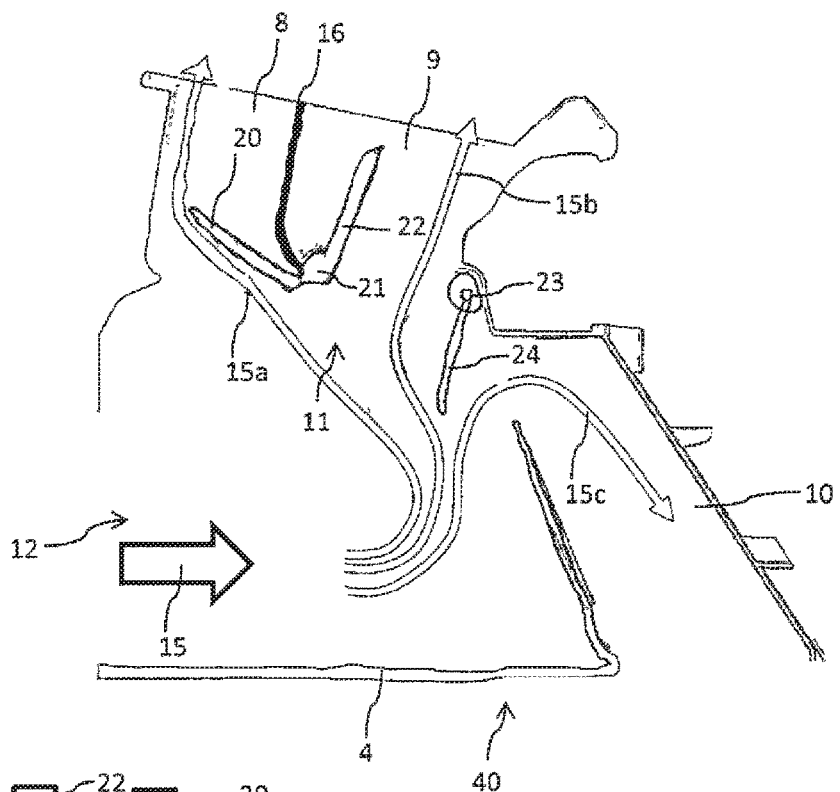
Fig. 5
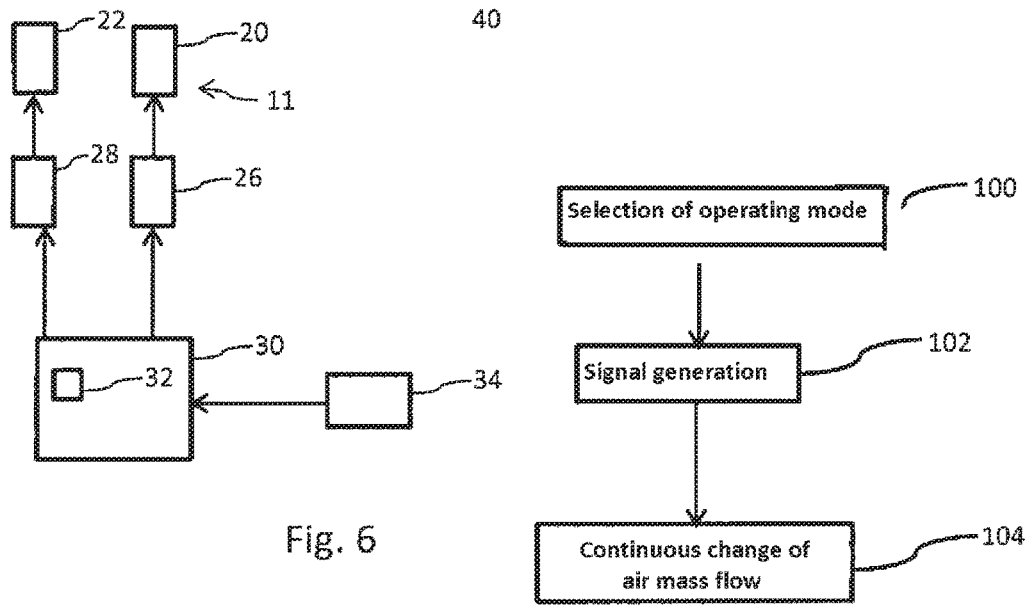
Fig. 6
Fig. 7

VENTILATION APPARATUS FOR A MOTOR VEHICLE

CROSS-REFERENCE TO RELATED APPLICATION

This application claims priority to German Patent Application No. 202015004835.8, filed Jul. 7, 2015, which is incorporated herein by reference in its entirety.

TECHNICAL FIELD

The present disclosure pertains to a ventilation apparatus for a motor vehicle for distributing an air mass flow at least two air outlets arranged at a distance from one another in an interior space of a motor vehicle. A motor vehicle having such a ventilation apparatus and a computer program for operating such ventilation apparatus are also provided.

BACKGROUND

In extreme weather conditions, for example when outdoor temperatures are particularly low or high, it is desirable to warm up or cool down the vehicle interior space (i.e., the passenger cabin of a motor vehicle) to a comfortable temperature as quickly as possible, roughly in the range of the usual room temperature. For example, a motor vehicle equipped with an air conditioning system can deliver significant cooling power shortly after it is switched on.

In order to achieve the fastest possible cooling of a motor vehicle interior space that has been heated by direct sunlight, for example, it has previously been common practice to cause an air mass that has been cooled by an air conditioning system evaporator to flow into the vehicle interior space through one or more air outlets. In order to achieve the fastest possible cooling of a motor vehicle interior space, individual air outlets or air registers are exposed to a relatively strong and intense air mass flow.

However, a comparatively cold, strong air mass flow may be perceived as unpleasant and uncomfortable by vehicle occupants. It is further conceivable that the vehicle occupants may tend to perspire, particularly in hot outdoor temperatures, and their clothing may be correspondingly damp. When people who are sweating are exposed to a relatively strong blast of cool air, in this respect there is an increased risk of infection.

In the context of such a scenario, it is desirable to provide a ventilation apparatus that is improved in this respect, and in particular ensures improved comfort for the vehicle occupants together with rapid cooling or warming of the vehicle interior space. Such a ventilation apparatus must be created with as little extra design engineering work as possible, and as far as possible with components that already exist.

SUMMARY

In accordance with the present disclosure, a motor vehicle ventilation apparatus is provided including a distributor housing having at least two air ducts leading from the distributor housing. Through these two outgoing air ducts, an air mass flow that is fed to the housing or produced inside the housing is able to be distributed to at least two air outlets arranged at a distance from one another in an interior space of a motor vehicle. The air ducts leading from the distributor housing are each in flow communication with at least one of the air outlets. In addition, at least one servo unit is movable by a drive unit arranged adjacent to at least one of the air ducts in the distributor housing. The drive unit for the servo unit is also coupled to a controller, which is configured to actuate the drive unit continuously to alter the distribution of the air mass flow to the at least two air ducts.

Thus, a distribution of the air mass flow to the air ducts can be altered continuously by the servo unit. To this end, the servo unit is designed to alter the air mass flow continuously, that is to say constantly or persistently, in particular to constantly or persistently alter the distribution of the air mass flow to the at least two air ducts.

When the ventilation apparatus is operated, in particular by selecting a corresponding operating mode, for example a relatively intense or high total air mass flow may be distributed to at least two air ducts or two air outlets in permanently variable manner. In this way, a static, permanent, relatively powerful flow of air directed at the vehicle occupants may advantageously be avoided. At most, the vehicle occupants are only exposed to a relatively powerful, temperature controlled air flow for a short time or in the temporal average of a number of highly variable, relatively strong air flows, which are subject to continuous or constant variation with regard to their direction and/or intensity.

Due to the continuous or permanent variation and distribution of the air mass flow to at least two air ducts, it is possible to modify the temperature in the motor vehicle interior space to a predetermined setpoint temperature quickly without perceptibly compromising the feeling of well-being or comfort of the vehicle occupants.

The air outlets may be arranged in typical manner in the motor vehicle interior space. For example, single air outlets may be aligned upwards in the vertical axis of the vehicle (z) and arranged below a front windscreen, particularly below a bottom point or a lower end zone of a front windscreen.

Further air outlets may be embedded in an instrument panel, for example. They may be arranged at various points in an instrument panel in a direction transverse to the motor vehicle (y). Single air outlets are typically located on the left and right sides of an instrument panel and approximately in the middle of the instrument panel. Additional air ducts may be arranged in the area of a center console and above a tunnel in the floor structure in the motor vehicle interior space, for example.

The outlets may serve for example to discharge air into the foot well behind the driver's and the front passenger's seats, for example. Further air outlets may be embedded in a trim on the A-pillar a trim on the B-pillar or a trim on the C-pillar, and in the trim of a roof structure of the vehicle bodywork. The continuously variable distribution of the air mass flow to at least two air ducts and subsequently to air outlets in flow communication therewith may thus serve to produce permanently and continuously changing airflows in the vehicle interior space, which might well be perceived by the vehicle occupants as much more pleasant than a unidirectional air flow that remains constant or static over a period of time.

According to a further variant, the servo unit adjacent to one of the air ducts has at least one flap that is mounted pivotably or slidably on the distributor housing. With a flap mounted pivotably or slidably on the distributor housing, the cross section of at least one of the air ducts at which the air mass may be directed and through which it may flow is continuously and permanently variable, delivering a continuous changeable distribution of the air mass flow to the at least two air ducts, and finally to the air outlets in flow communication therewith.

In general, it is already sufficient if the servo unit only has one flap, which is mounted in pivotable or slideable manner on the housing to merely close a part of one of the air ducts. In this way, the air mass flowing through the air duct in question may be throttled variably over time but continuously, thereby creating flow ratios that are also variable, and different air mass flows in each different air duct.

According to a further variant, it is further provided that the at least one flap is mounted on the housing in such manner as to be movable alternatingly between an open and a closed position, and that in the closed position the at least one flap closes at least a part of at least one of the air ducts as far as air flow is. In this context, it is further conceivable that in the closed position the flap closes the air duct in question completely with regard to air flow. In this case, the entire air mass flow is directed to the air duct that remains open.

It may be further provided that the servo unit, or the at least one flap allocated thereto, is only able to take up positions inside the distributor housing in which at least one of the at least two air ducts may be constantly exposed to an air mass flow that is fed into the housing or produced therein. The servo unit thus ensures that the available air mass flow is always able to escape through at least one of the air ducts.

In particular, variants of the ventilation apparatus are conceivable in which when the servo unit, or the at least one flap allocated thereto, is in the closed position, it only closes a partial area of the air duct in question, so that a certain minimum air flow is always able to flow through each of the outgoing air ducts for all possible positions of the servo unit or the at least one flap allocated thereto.

If an electric drive unit is coupled to the servo unit, the at least one flap that is pivotably or slidably mounted on the housing is able to be operated and moved electrically as it were between an open and a closed position. The electric drive unit and its coupling to the servo unit, or the at least one flap assigned thereto particularly enables a purely software-based implementation of an advantageous variant of the present disclosure. In order to implement that variant, no design engineering or structural changes to a ventilation apparatus are necessary in this regard. A continuous or permanent distribution of the air mass flow may thus be implemented particularly simply and inexpensively.

According to a further variant, the electric drive unit is controlled by a processor for follow a preset operating mode, an operating mode that may be selected by a user, or a manually adjustable operating mode in each case. In such case, a corresponding processor or computing unit is typically provided in the controller for the electric drive unit. A corresponding processor may be implemented for example in the controller of a ventilation apparatus in an air conditioning system and in a motor vehicle controller. The controller provided for the drive unit as described here may also be functionally integrated in a motor vehicle controller.

With the aid of at least one processor-controlled electric drive unit for the servo unit, and accordingly for the at least one flap allocated thereto, it is possible to assure a continuous change in the distribution of the air mass flow in a wide variety of ways. In this respect, various operating modes may be made available, which can be selected manually by the user, or the user may individually define his own operating modes for changing the distribution of air mass flow to at least two air ducts.

In this context, according to a further variant it is particularly provided that the servo unit is displaceable continuously, constantly or incrementally. In particular it is conceivable that the at least one flap of the servo unit is moved continuously and constantly by the drive unit, or that the servo unit is activated incrementally but continuously, that is to say successively after single intervals to change the air mass flow by the drive unit.

According to a further variant, it is also conceivable that the servo unit is displaceable periodically. For example, periodically recurring control signals may be sent to the electric drive unit for the servo unit. Corresponding control signals may be produced with the aid of a processor or for example read out in periodically recurring manner from a "look-up table" (LUP).

Mechanical implementations are also conceivable for the periodic repositioning of the servo unit. For example, a permanently rotating electric motor may be connected to a pivotably mounted flap via a crank. In this way, a permanently and constantly rotating drive may be converted to a sinusoidal amplitude of a pivoting motion of a flap of the servo unit, for example.

According to a further variant, the servo unit has at least two flaps, which are each movable independently of each other and movable separately by one electric drive unit. In this context, it is further conceivable that the at least two flaps of the servo unit are also movable with only a single, common drive unit. The at least two flaps are then typically coupled to one another mechanically. Two flaps may be coupled mechanically for example by a coupling rod or a crank, for example.

If two flaps are implemented, it is possible to achieve a more flexible, more comprehensive change in the distribution of the air mass flow to the at least two air ducts than with variants relying on only one flap. Moreover, with at least two flaps a continuously changeable distribution of the air mass flow may also be directed to more than two air ducts, to three or even four air ducts for example. According to a further variant, it is also conceivable that the servo unit has at least four flaps that are activatable via a drive unit, by which flaps a distribution of air mass flow to four or more air ducts leading from the distributor housing, for example, may be varied continuously or permanently.

According to a further aspect, a motor vehicle equipped with a ventilation apparatus as described in the preceding text is provided. The ventilation apparatus may particularly be part of a heating, ventilation or air conditioning system, generally referred to as a HVAC module (Heating, Ventilating and Air Conditioning). However, the ventilation apparatus, in particular the distributor housing therefor, may also be arranged downstream of a motor vehicle air conditioning system for technical flow purposes.

According to a further aspect, a computer program is provided to operate a ventilation apparatus as described in the preceding text. The computer program designed to actuate an electric drive unit that is coupled to a servo unit of the ventilation apparatus. In this context, the computer program has programming means for continuously actuating the drive unit and for continuously moving the servo unit, so that the distribution of the air mass flow to at least two air ducts undergoes a continuous or permanent change.

In this respect, the ventilation apparatus described previously, or the operating mode of the ventilation apparatus described previously, may be implemented with a continuously changing distribution of an air mass flow carried out solely by software. In this way, the extended functionality of the ventilation apparatus may be created at practically no additional cost and with no additional design effort.

According to a further variant of the computer program, it includes programming code for the continuous, constant, incremental and/or periodic shifting of the servo unit. In particular, the computer program may include a function or corresponding programming code for generating corresponding control signals for a continuous, constant, incremental and/or periodic actuation of an electric drive unit. The drive unit is coupled mechanically to at least one flap of the servo unit.

According to a further aspect, a method for operating a ventilation apparatus as described in the preceding text is provided, according to which a servo unit which is located in a distributor housing of a ventilation apparatus described previously and is movable by a drive unit is actuated continuously to change a distribution of the air mass flow to at least two air ducts. In this context, it is provided in particular that the servo unit is actuated or operated permanently and constantly, and shifted continuously, constantly, incrementally and/or periodically.

According to a further aspect, a device is also provided for operating a ventilation apparatus as described previously. The device is designed to actuate an electric drive unit, which electric drive unit is coupled to a servo unit of the ventilation apparatus. The device continuously changes a distribution of the air mass flow to at least two air ducts may include a controller or other means configured to continuously actuate the drive unit and for continuously moving the servo unit.

According to a further variant, the device for operating a ventilation apparatus further includes controller or other means continuously, constantly, incrementally and/or periodically shift the servo unit.

It should also be noted that the computer program, the device for operating the ventilation apparatus and the method for operating the ventilation apparatus are directly correlated with the ventilation apparatus, and that to this extent all features and properties described with reference to the ventilation apparatus apply equally for the computer program, the method for operating the ventilation apparatus and the device for operating the ventilation apparatus.

BRIEF DESCRIPTION OF THE DRAWINGS

The present disclosure will hereinafter be described in conjunction with the following drawing figures, wherein like numerals denote like elements.

FIG. 5 is an alternative variant of a distributor housing with a total of three flaps;

FIG. 6 is a block diagram of the ventilation apparatus; and

FIG. 7 is a flowchart of a method for operating a ventilation apparatus.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
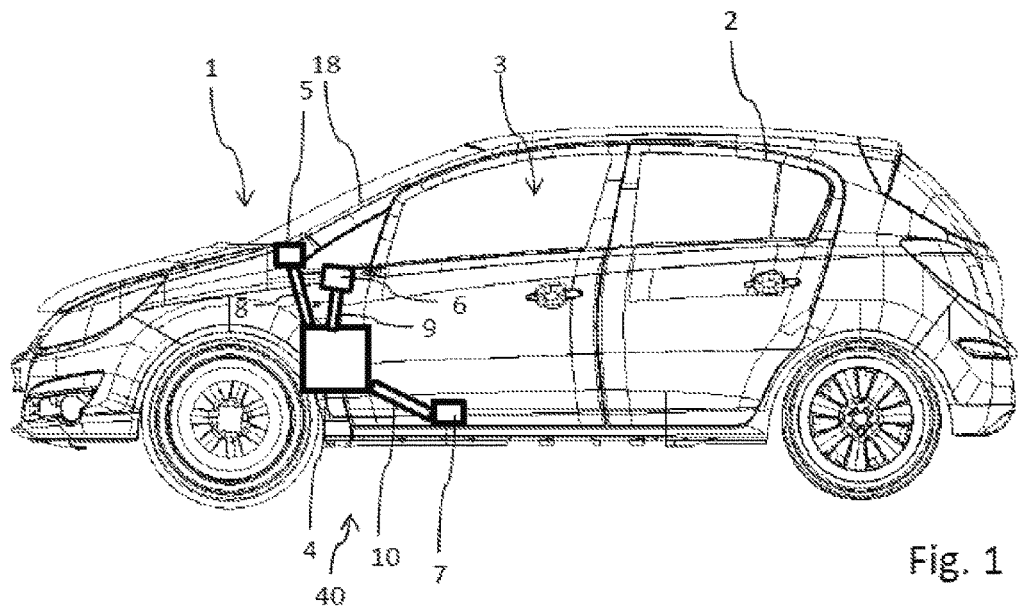
FIG. 1 is a schematic side view of a motor vehicle.

The motor vehicle 1 represented in FIG. 1 includes a motor vehicle bodywork 2 and an interior space 3 formed by motor vehicle bodywork 2, which functions as a passenger cabin for the vehicle occupants. Motor vehicle 1 is further equipped with a ventilation apparatus 40. This may be integrated in an HVAC module, for example, and consequently also in a heating, ventilation or air conditioning system of motor vehicles 1, or it may itself be such a system.

Motor vehicle ventilation apparatus 40 includes at least one distributor housing 4 with, in the present embodiment, three outgoing air ducts 8, 9, 10. In this context, the individual air ducts 8, 9, 10 are connected in parallel and may receive a mass air flow 15 that is either supplied from the outside or produced inside the distributor housing 4 based on the function of a servo unit 11 arranged in the interior of distributor housing 4.

Individual air outlets 5, 6, 7 are arranged at the downstream end of each of air ducts 8, 9, 10. For example, air outlet 5, which is arranged at the end of air duct 8, is located below a foot or base area of a front windscreen 18. Air outlet 6, which is in flow communication with air duct 9, is integrated in an instrument panel, for example, and may be equipped with a manually operable air register, for example. The remaining air outlet 7 is arranged at the downstream end of air duct 10. It is located for example in the foot well in the floor area of vehicle bodywork 2.

Figure 2:
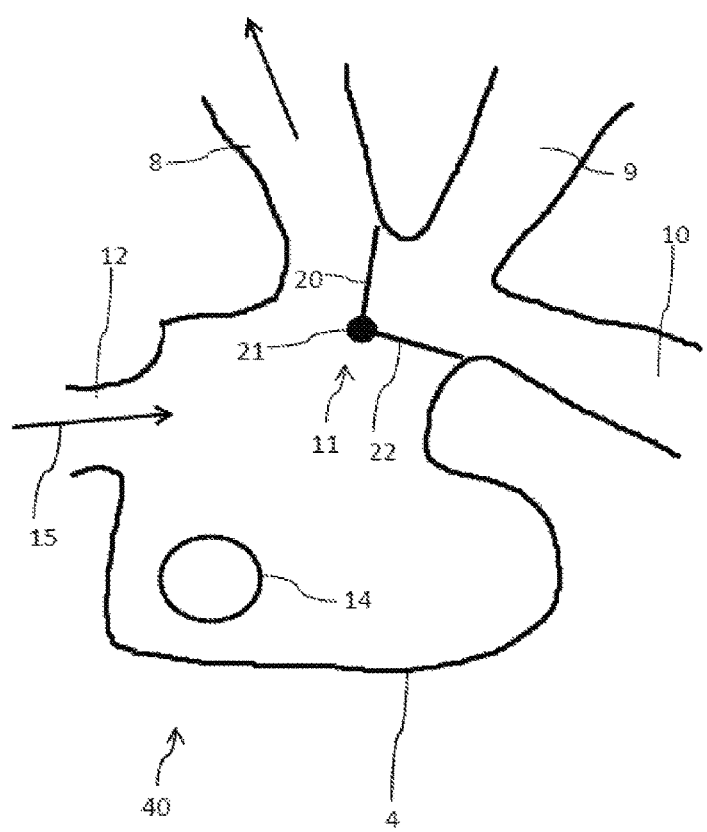
FIG. 2 is a highly simplified, schematic representation of a first configuration of a ventilation apparatus with a distributor housing.

FIG. 2 shows a highly simplified representation of a distributor housing 4. Distributor housing 4 has an air inlet 12, through which an air mass flow 15 may be fed into distributor housing 4. In the present embodiment, an electrically operable blower 14 is also arranged in distributor housing 4, and may serve to produce or strengthen air mass flow 15. On the outlet side, distributor housing 4 is furnished with individual air ducts 8, 9, 10, toward which a partial air mass flow may be directed variably by a servo unit 11.

Figure 3:
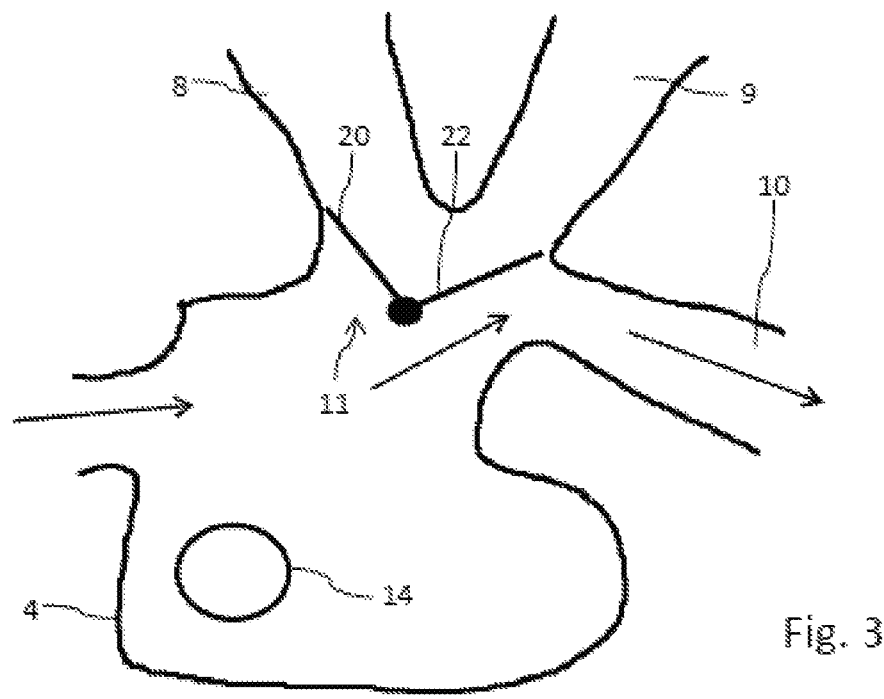
FIG. 3 is a representation of a second configuration of the distributor housing.
Figure 4:
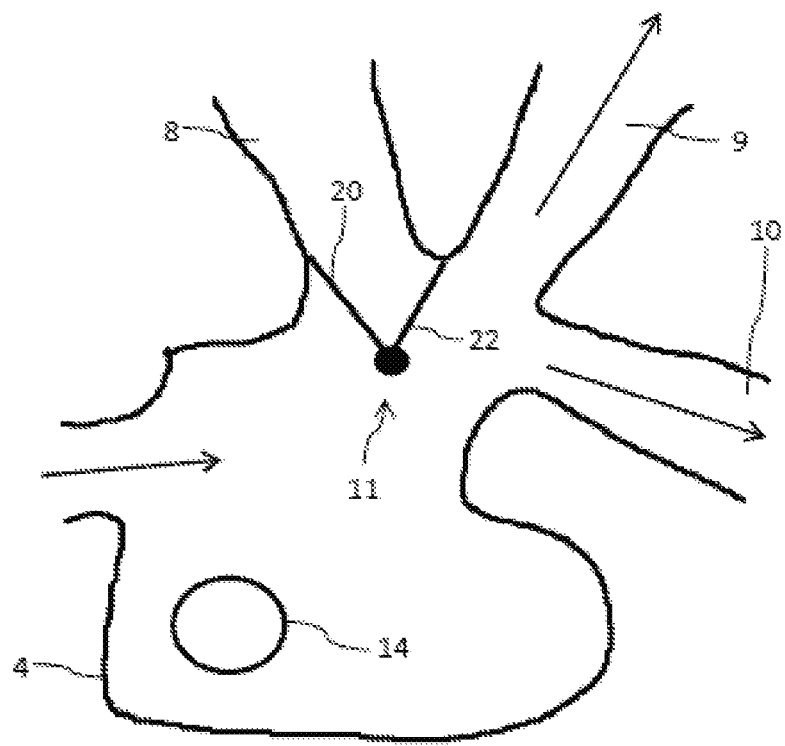
FIG. 4 is a further representation of a third configuration of the distributor housing.

In the various configurations according to FIGS. 2 to 4, the available air mass flow 15 may be directed toward each of the individual air ducts 8, 9, 10. In the example shown, a servo unit 11 having two flaps 20, 22 is arranged in the intersection area of air ducts 8, 9, 10. Servo unit 11 is operable by a drive unit 26, 28, which is not shown explicitly in FIGS. 2 to 4.

In the present example, flaps 20, 22 of servo unit 11 are mounted so as to be pivotable. In the configuration according to FIG. 2, flaps 20, 22 are arranged in such manner that air can only flow through air duct 8. In the further flap position according to FIG. 3, air can only be directed toward air duct 10, whereas in the configuration according to FIG. 4 the air mass flow 15 can be directed toward two of the total of three air ducts 8, 9, 10, namely air ducts 9, 10.

A operating mode is provided for the present ventilation apparatus 40 in which servo unit 11 is continuously actuated by the associated drive unit 26, 28, so that the distribution of air mass flow 15 to the three air ducts 8, 9, 10 is varied permanently. The various configurations according to FIGS. 2, 3 and 4 thus represent only single snapshots of a continuous shifting movement of servo unit 11. In this way, the entire volume of available air mass flow 15 may be distributed to the three air ducts 8, 9, 10 continuously or constantly, or alternatively in incremental or periodically recurring manner, always variably over time.

In the further variant of ventilation apparatus 40 according to FIG. 5, distributor housing 4 is also equipped with three outgoing air ducts 8, 9, 10. Air ducts 8, 9 are separated from one another with regard to air flow by a partition wall 16. Two flaps 20, 22 are provided, on an upstream end section of the partition wall 16 and are mounted in distributor housing 4 so as to be pivotable about a common pivot axis 21. The remaining air duct 10 which opens into distributor housing 4 at some distance from air ducts 8, 9, is furnished with its own, separate flap 24, which is pivotable about another pivot axis 23.

In the representation of FIG. 5, all air ducts 8, 9, 10 are in flow communication with an interior space of distributor housing 4. Accordingly, the total volume of available air mass flow 15 may be split into three separate partial air mass flows 15*a*, 15*b* and 15*c*. Partial air mass flow 15*a* passes into air duct 8, partial air mass flow 15*b* passes into air duct 9 and partial air mass flow 15*c* passes into air duct 10.

Both flaps 20, 22, as represented in FIGS. 2 to 5, may be coupled separately to an individually associated drive unit 26, 28 according to the block diagram illustrated for exemplary purposes in FIG. 6. Each of the two drive units 26, 28 is in communication with a controller 30, which has at least one microprocessor 32. Controller 30 is also coupled to a control element 34. The control element 34 may serve to enable the user to select an operating mode for the ventilation apparatus 40, so that the distribution of the entire volume of the available air mass flow to air ducts 8, 9, 10 is varied continuously.

Control element 34 may be in the form of a switch or controller that is operable manually by the user. However, it is also conceivable to provide the control element 34 in virtual form only, for example as a data link with a motor vehicle controller. It is conceivable that the operating mode for continuously changing the distribution of the air mass flow described here may be selectable or deselectable via software in a configuration menu. To this extent, control element 34 may be connected to another controller of the motor vehicle in the form of a data cable or on-board bus system.

Finally, FIG. 7 shows a flowchart of a method for operating ventilation apparatus 40. In a first step 100, the end user may use control element 34 to select an operating mode according to which the distribution of the air mass flow 15 to air ducts 8, 9, 10 is varied continuously. In a subsequent step 102, the selection of the user is activated by microprocessor 32, that is to say controller 30. In step 102, corresponding control signals are generated for drive units 26, 28, before in a following step 104, drive units 26, 28 are moved correspondingly, together with the flaps 20, 22, 24 of servo unit 11 that are movable in order to continuously alter the distribution of the air mass flow 15 to air ducts 8, 9, 10.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle ventilation apparatus comprising:
   a distributor housing configured to discharge an air mass flow;
   a first air duct in fluid communication with the distributor housing and having a first air outlet configured to be arranged in an interior space of a motor vehicle;
   a second air duct in fluid communication with the distributor housing and having a second air outlet configured to be arranged in the interior space at a distance from the first air outlet, the first air duct separated from the second air duct by a partition wall;
   a third air duct in fluid communication with the distributor housing and having a third air outlet configured to be arranged in the interior space at a distance from the first and second air outlet;
   a servo unit arranged in the distributor housing adjacent to the first and second air ducts, wherein the servo unit is positionable for selectively concealing and revealing the first and second air ducts, the servo unit comprising a first flap pivotable around a first axis and supported on an upstream end of the partition wall and mounted in the housing and a second flap pivotable around the first axis and supported on the upstream end of the partition wall and mounted in the housing, the first flap pivotable to conceal and reveal the first air duct and the second flap pivotable to conceal and reveal the second air duct;
   a first drive unit coupled to the servo unit for selective positioning thereof, wherein the first and second flaps are selectively positionable independent of each other and are each movable by the first drive unit;
   a third flap pivotable around a second axis different than the first axis, the third flap selective concealing and revealing the third air duct;
   a second drive unit coupled to the third flap for selective positioning of the third flap; and
   a controller in communication with the first drive unit and the second drive unit, the controller configured to actuate the first drive unit and the second drive unit for selectively positioning the servo unit and the third flap continuously altering the positions of at least one of the first flap, the second flap and the third flap to continuously alter a flow rate of the air mass flow to the first, second and third air ducts.

2. The motor vehicle ventilation apparatus according to claim 1, wherein the controller is configured to control the first drive unit and the second drive unit according to an operating mode selected by a user.

3. The motor vehicle ventilation apparatus according to claim 1, wherein the servo unit is positionable in at least one of a continuous mode, a constant mode or an incremental mode.

4. The motor vehicle ventilation apparatus according to claim 1, wherein the servo unit is positionable in a periodical mode.

5. The motor vehicle having a motor vehicle ventilation apparatus according to claim 1.

6. The motor vehicle ventilation apparatus according to claim 1, wherein the third flap is supported on a wall of the second air duct and mounted in the housing, and the third flap is pivotable about the second axis relative to the wall of the second air duct to conceal and reveal the third air duct.

7. A method for ventilating an interior space of a motor vehicle comprising:
   discharging an air mass flow from a distributor housing;
   selectively pivoting a first flap of a servo unit over a first air duct in fluid communication with the distributor housing for directing at least a portion of the air mass flow to a first air outlet arranged in the interior space of the motor vehicle;
   selectively pivoting a second flap of the servo unit over a second air duct in fluid communication with the distributor housing for directing at least a portion of the air mass flow to a second air outlet arranged in the interior space at a distance from the first air outlet, the first air duct separated from the second air duct by a partition wall, the first flap of the servo unit pivoting around a first axis and supported on a downstream end of the partition wall and mounted in the housing, and the second flap of the servo unit pivoting around the first axis and supported on the downstream end of the partition wall and mounted in the housing, the first flap pivoting to conceal and reveal the first air duct and the second flap pivoting to conceal and reveal the second air duct; and selectively positioning a third flap over a third air duct in fluid communication with the distributor housing for directing at least a portion of the air mass flow to a third air outlet arranged in the interior space at a distance from the first air outlet;

wherein a controller in communication with a first drive unit configured to selectively position the servo unit and a second drive unit configured to selectively position the third flap is configured to continuously alter a flow rate of the air mass flow to the first, second, and third air ducts by continuously altering the position of at least one of the first flap, the second flap and the third flap.

8. A non-transitory computer readable medium having a computer program stored thereon, which when executed by the controller, is configured to execute the method according to claim 7.

* * * * *